Inventor
JOHN S. WINTER

June 29, 1948.                    J. S. WINTER                    2,444,319
                              AIRPLANE LANDING GEAR
Filed Dec. 8, 1944                                           3 Sheets-Sheet 2

INVENTOR
JOHN S. WINTER
BY George F. Goodyear
ATTORNEY

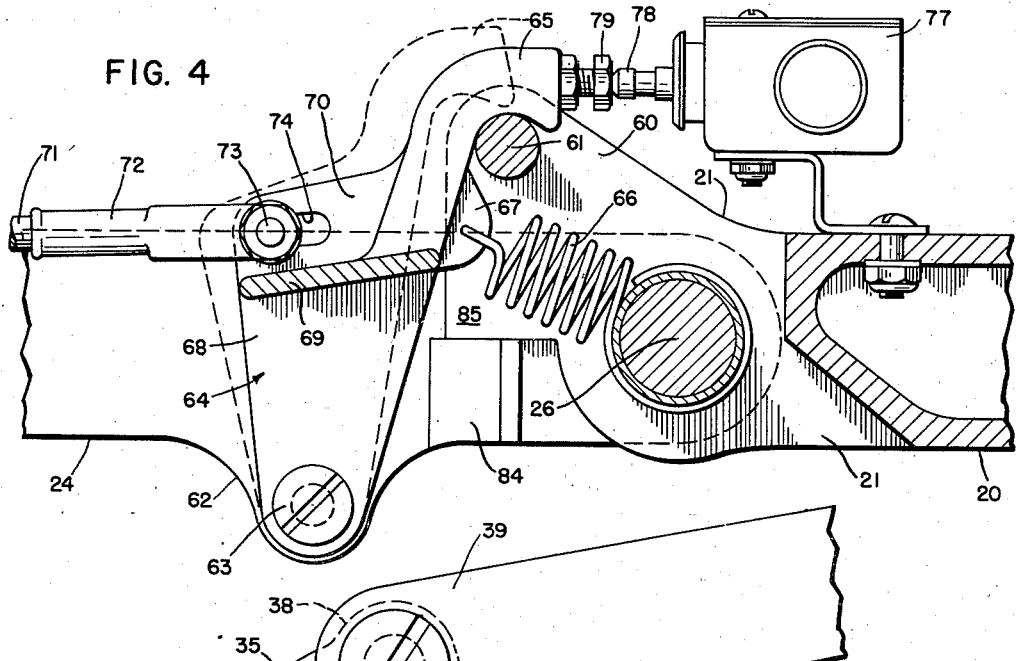

Patented June 29, 1948

2,444,319

UNITED STATES PATENT OFFICE 2,444,319

AIRPLANE LANDING GEAR

John S. Winter, Ferguson, Mo., assignor to Curtiss-Wright Corporation, a corporation of Delaware Application December 8, 1944, Serial No. 567,198

3 Claims. (Cl. 244—102)

The present invention relates to retractable landing gears and is directed particularly to an improved landing gear latching system.

It is an object therefore to provide a retractable landing gear having a simple and quick acting latching mechanism which is operative to latch the gear in both the extended and retracted position.

A further object resides in the arrangement of a latching system which is automatic in its function to latch and unlatch the gear in each of its extreme positions of extension or retraction.

An object also may be found in the arrangement of a floating gear actuating means which provides a positive actuating system for operating the latching mechanism.

Figure 1:
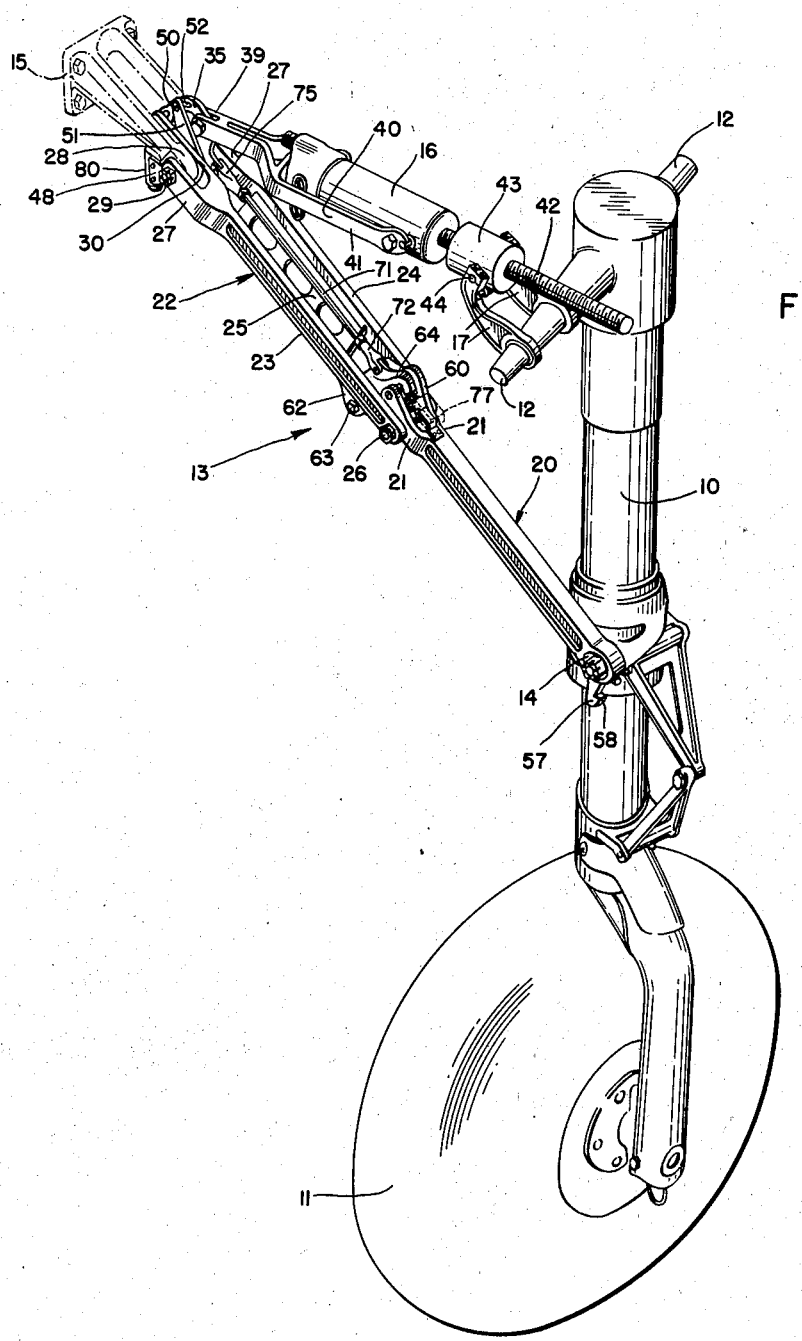
Figures 2, 3:
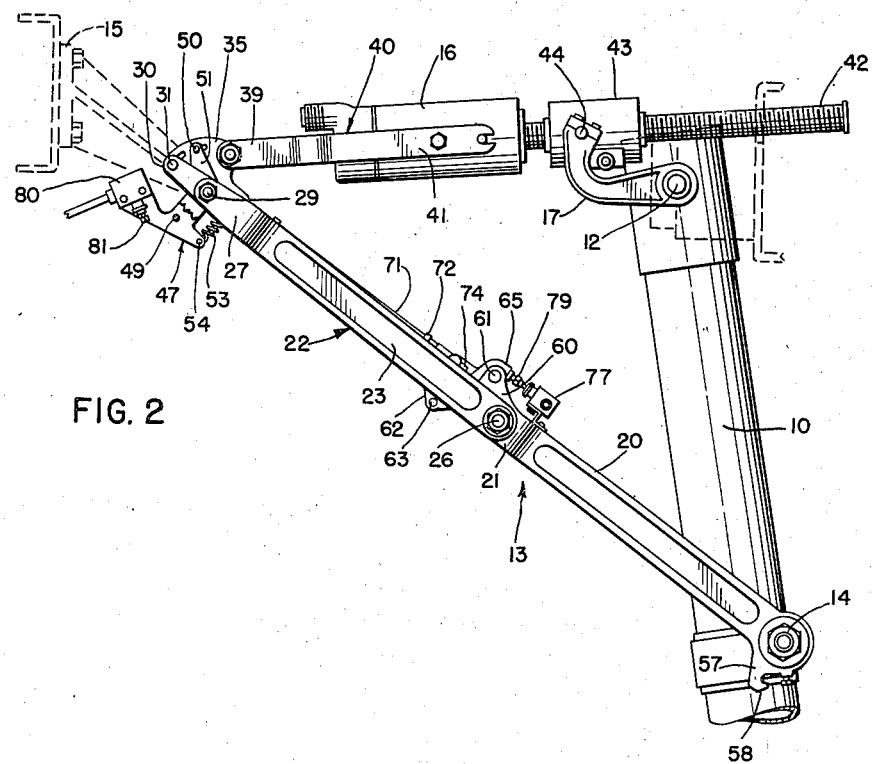

The preferred embodiment of this invention is illustrated in the accompanying drawings, in which:

Figure 1 is an assembly view in perspective of the landing gear in its extended position, Figure 2 is a front elevational view of the gear retracting and latching mechanism in its extended position, Figure 3 is a view similar to that in Figure 2 but showing the gear in its retracted position, Figure 4 is a greatly enlarged partial sectional view in elevation of the latch mechanism for the gear when extended, and Figure 5 is a view similar to that of Figure 4 but illustrating the latch mechanism for the gear when retracted and further showing in detail the primary latch operating mechanism.

The landing gear shown in Figure 1 comprises a shock strut 10 having a wheel 11 mounted at its lower end and provided with a pair of trunnion bearings 12 at its upper end. The trunnions 12 extend in a generally fore and aft direction such that the gear may be retracted laterally, that is inwardly toward the center of the aircraft. A foldable bracing strut 13 is pivotally connected at the shock strut as by means of a spherical bearing member 14. The upper end of the foldable strut is pivotally attached to a fixed bracket 15 carried by the structure of the wing or fuselage. The gear retracting and extending means comprises a power unit 16 which is operatively connected by means of a pair of crank elements 17 to one of the trunnion arms 12 at the upper end of the shock strut 10. The inboard or opposite end of this retracting means is operatively connected to the upper end of the foldable bracing strut in a manner later to be described in detail. The manner of mounting and arranging the actuating means 16 between the foldable strut 13 and the main wheel strut 10 permits the unit to float between its operative end supports and thus assume the proper angular positions for actuating the gear.

The foldable brace strut 13 (Figures 1 and 2) includes a lower arm or element 20 carried on the shock strut 10 by the spherical bearing 14 at its lower end. The upper end of this element is bifurcated as at 21 to receive and embrace a latch means which will be described presently. The upper folding arm or element 22 comprises a pair of side members 23 and 24 structurally interconnected by a web or plate 25 to form a rigid strut. The lower end of each of the side members 23 and 24 is pivotally connected to the furcations 21 of the arm 20 by means of a pivot pin 26 as shown (Figure 1). The upper spaced ends of the side members 23 and 24 of arm 22 are each bifurcated as at 27 for pivotal connection to the bearing bosses 28 of bracket 15 by pins 29. It will be seen that the inner furcation 30 of the arm 23 is extended beyond the folding pivot pin 29. Similarly the corresponding furcation 30 (Figure 5) on side member 24 of the arm 23 extends beyond the pivot pin 29 and a pin element 31 is fixed between these furcations as will be seen in Figures 2, 3 and 5. The pin 31 is provided to cooperate with a latching and latch operating means operatively positioned between the spaced bifurcated ends 27 as will be described hereinafter.

The landing gear up-latch and associated latch operating mechanism (Figure 5) includes a latch operator or sector element 35 which is operatively mounted on the pin 29 between the portions 30 of arms 23 and 24 for pivotal movement with respect thereto. This sector is formed with an enlarged portion 36 in which an arcuate slot 37 is provided for cooperation with the fixed pin 31 before noted. Therefore, the sector 35 may move about pivot 29 and relative to the pin 31 and hence relatively to the upper foldable arm element 22 to a limited extent as determined by the length of arcuate slot 37. At another enlarged portion 38 of this sector which is circumferentially spaced from the portion 36 there is provided a pivot connection for one end 39 of a yoke-type cradle 40 on which the actuator unit 16 is carried. The unit 16 is supported between the spaced arms 41 of the cradle by means of bolts which are spaced from the slotted ends thereof, the slotted ends receiving a fixed pin or boss on the casing of the unit as is clearly shown in Figures 2 and 3. In the present instance the unit 16 is indicated as being of electrical type and operable to actuate the gear through a jack shaft 42 and threaded nut 43, the traveling nut 43 being secured to the strut crank arms 17 by trunnions 44. The gear retraction is effected upon outward movement of the nut 43 on jack shaft 42 (Figure 3), while extension is effected upon inward travel of the nut (Figure 2).

As the unit 16 and nut 43 expands or contracts to rotate the main strut 10 about its trunnions 12 the latch operator 35 will move about the pivot 29 to the limit of the slot 37. Therefore, the initial motion of the unit 16 will move the sector 35 and provide sufficient travel or motion for effecting the latching and unlatching of the gear in both of its extreme positions as will presently appear.

Referring now to Figure 5 for details of the up-latch system it will be observed that a latch plate 47 pivotally mounted on the pin element 29 to embrace the latch operator is provided with a depending portion 48 upon which is carried a latch pin 49. The plate is permitted a limited amount of angular movement about pin 29 by means of the engagement of a pin 50 on upper plate arm 51 within an arcuate slot 52, formed in the sector element 35. However, the plate 47 is urged or biased in a counterclockwise direction by the resilient member 53 which is mounted over a pin 54 carried on a second arm 55 of the plate 47. The opposite end of this resilient member is secured in an extension element 56 which constitutes a portion of the sector element 35 all as clearly shown in Figure 5.

The pin 49 carried on latch plate 47 is adapted to cooperate with a lach hook 57 which is formed integrally with the foldable arm 20, and is positioned at the lower end thereof as in Figures 1 and 2. This hook is provided with a leading cam-like nose face 58 so that upon gear retraction the latch operation will be entirely automatic to the extent that as the cam face 58 contacts the pin 49 the latch plate will be moved against the action of spring 53 to effect a snap-in engagement between hook and pin. Release of this latch is effected upon contraction of the traveling nut 43 which rotates the sector element in a clockwise direction and since the pin 50 is held in the lower end of the slot 52 by spring 53 the latch plate 47 is simultaneously rotated in a clockwise direction by arms 51 to the dotted line position. This movement carries the latch pin 49 to the dotted line position where it will be clear of the latch hook 57. Thereafter the gear may drop free of the latch pin and be moved to the fully extended position as in Figure 2. The fully retracted and latched position of the gear is shown in Figure 3, where further details thereof and the relative positions of the several parts and elements may be observed.

The latch mechanism for securing the gear in its extended position may be seen in Figures 1, 2 and 4. It will be observed that the furcations 21 of the arm 20 are formed with upstanding lugs 60 for the positionment of a latch pin 61 therebetween. Similarly, the respective side members 23 and 24 of the upper strut 22 are provided with depending lugs 62 for the securement of a pivot pin 63. A latch member 64 is mounted on this pivot pin to move between the side members 23 and 24 and latch finger or hook 65 integral with member 64 cooperates with pin 61 in securing the strut 13 against displacement from the extended, straight line position. The latch 64 is biased into latching position by a spring element 66, one end of which is hooked to the latch at lug 67 while the other end is coiled about the main pivot shaft 26. The latch member 64 is further formed as a stirrup structure in which depending side elements 68 are united by a cross plate or web 69. The centrally positioned hook 69 is therefore suitably stiffened by a flange 70.

The means whereby the hook 65 may be removed from engagement with pin 61 to permit gear retraction comprises a draw rod 71 operatively associated with the hook by means of a rod yoke 72 in lost motion connection with the hook flange 70 through a pin 73 and slot 74. The upper or opposite end of this draw rod 71 is connected to the sector plate 35 through a rod yoke 75 pivoted on the boss 56 (Figure 5).

Upon retraction of the landing gear the energization of unit 16 causes counterclockwise movement of sector 35 about pivot 29. Due to the lost motion between plate 35 and the upper end 30 of the folding arm 22 as determined by pin 31 in slot 37, the first motion of unit 16 will cause draw rod 71 to move to the left or in a latch retracting direction. Thus hook 65 is moved to the dotted position in Figure 4. Thereafter the gear will retract to the position in Figure 3 where hook 57 snaps into engagement with pin 49 as hereinbefore described.

Since this system is electrically actuated by unit 16 it is necessary to provide cutoff switches at each latch so that the current supply to the motor of unit 16 may be cut off at the proper time. For this purpose a first limit switch 77 is suitably mounted on arm or strut 20 adjacent the nose of the latch finger 65 so that the switch plunger 78 may be contacted by an adjustable striker element 79 mounted thereon. Similarly, a second limit switch 80 conveniently secured to the plate portion 48 (Figure 5) is equipped with a plunger 81 which is contacted by an adjustable striker element 82 mounted on a suitable boss 83 formed on the strut member 20. Also in Figure 4 there is shown a stop lug 84 secured to the inner surface of strut arm 24 in position to be contacted by a cooperating projection 85 formed by the adjacent flanges of the strut arm 20. The lug and projection prevent the folding strut 13 from passing beyond a straight line relation when unfolded for extending the gear.

It is now apparent that the present landing gear may be latched in either of its extreme positions by an improved system of automatically operated latch means. It is also pointed out that the initial motion of the gear power unit is used to operate the latches to unlatching position followed by actual movement of the gear.

The possibilities for changing or modifying certain portions of the preferred mechanism is quite evident and therefore it is the aim to cover all such changes or modifications in the appended claims.

I claim as my invention:

1. A retractable landing gear organization for an airplane comprising a shock strut pivotally connected with the airplane, a brace member pivotally connected to the shock strut and provided with a fixed detent at one end and a fixed hook at the opposite end, a second brace member pivotally connected with the first brace member and with the airplane and provided with a pivoted hook adapted to engage said fixed detent upon extension of the landing gear, an actuating sector pivotally mounted on the airplane adjacent the second brace member, a pivoted detent disposed adjacent the actuating sector and arranged to be engaged by the said fixed hook upon retraction of the landing gear, a link connecting in lost motion relation the actuating sector and the pivoted hook, a lost motion connection between the actuating sector and the pivoted detent, and a power unit for extending and retracting the landing gear organization, said power unit having a connection at one end with the actuating sector such that upon retraction rotation of the actuating sector will move the pivoted hook out of engagement with the fixed detent, and upon extension rotation of the actuating sector will move the pivoted detent out of engagement with the fixed hook.

2. A retractable landing gear organization for an aircraft comprising a shock strut pivotally connected with the aircraft, a brace member pivotally connected to the shock strut and provided with a fixed detent at one end and a fixed latch element at the opposite end, a second brace member pivotally connected with the first brace member and with the aircraft and provided with a pivoted movable latch element adapted to engage said fixed detent upon extension of the landing gear, an actuating element pivotally related to the second brace member adjacent the connection of the latter to the aircraft, a movable detent disposed adjacent the actuating element and arranged to be engaged by the said fixed latch element upon retracting of the landing gear, a link connecting in lost motion relation the actuating element and the pivoted latch element, a lost motion connection between the actuating element and the movable detent, and a jack for extending and retracting the landing gear organization, said jack having a connection at one end with the actuating element such that upon retraction pivotal motion of the actuating element will shift the movable latch element out of engagement with the fixed detent, and upon extension pivotal motion of the actuating sector will shift the movable detent out of engagement with the fixed latch element.

3. A retractable landing gear organization for an aircraft, comprising a shock strut member pivotally connected with the aircraft, a first brace member pivotally connected to the shock strut member, one of said members being provided with a first latch element, a second brace member pivotally connected with the first brace member and with the aircraft, latch means carried by said brace members for holding them in extended relation when the gear is projected, an actuating member and a second latch element pivoted coaxially with respect to the pivotal connection of the second brace member with the aircraft, said second latch element being engageable with the first latch element upon gear retraction to hold the gear in retracted position, a jack for projecting and retracting the gear, said jack having a connection at one end with said actuating element and at its opposite end with the shock strut member, and means operatively connecting said actuating element with said latch means, there being a lost motion connection between the actuating member and the second brace member whereby in operation of the jack to retract the gear the second brace member will move with the actuating member after an initial movement of the latter by and during which said latch means are released, and there being a lost motion connection between said actuating member and said second latch element whereby in operation of the jack to project the gear the second brace member will move with the actuating member after an initial movement of the latter by and during which said second latch member will be disengaged from said first latch member.

JOHN S. WINTER.

REFERENCES CITED

The following references are of record in the file of this patent:

FOREIGN PATENTS

| Number | Country | Date |
|--------|---------|------|
| 486,936 | Great Britain | June 9, 1938 |
| 538,298 | Great Britain | July 28, 1941 |